(12) United States Patent
Oh

(10) Patent No.: US 6,351,097 B1
(45) Date of Patent: Feb. 26, 2002

(54) MANAGE SYSTEM OF RECHARGEABLE BATTERY AND A METHOD FOR MANAGING THEREOF

(76) Inventor: Se Kwang Oh, 1-303 Hyundai Villa 172, Sangil-Dong Kangdong-ku, Seoul (KR)

( * ) Notice: Subject to any disclaimer, the term of this patent is extended or adjusted under 35 U.S.C. 154(b) by 0 days.

(21) Appl. No.: 09/503,250

(22) Filed: Feb. 14, 2000

(30) Foreign Application Priority Data

Feb. 12, 1999 (KR) .............................................. 99-5042

(51) Int. Cl.$^7$ ................................................. H02J 7/00
(52) U.S. Cl. ......................................... 320/107; 429/99
(58) Field of Search ........................... 320/107; 429/99, 429/100, 96, 97, 98; 307/150

(56) References Cited

U.S. PATENT DOCUMENTS

| | | | |
|---|---|---|---|
| 3,980,940 A | 9/1976 | Mabuchi et al. | 320/107 |
| 5,356,343 A | * 10/1994 | Lovetere | 472/57 |
| 5,760,570 A | * 6/1998 | Nagai et al. | 320/162 |

\* cited by examiner

*Primary Examiner*—Peter S. Wong
*Assistant Examiner*—Lawrence Luk

(57) ABSTRACT

The present invention illustrates about the managing device for batteries which expands the durability of batteries and enhances the charging effect by maintaining the termination voltage of the rechargeable batteries used in all kinds of electrical devices and managing method for rechargeable battery thereof. The present invention provides a managing system for rechargeable batteries comprising a plurality of cells, a closed loop circuit method which connects the cells in parallel connection electrically, an electrical load means having regular voltage which is the sum of the maximum output voltage among the plurality of cells and being in parallel connection with the rechargeable cells which are connected in parallel with the closed loop circuit method, a switching means inserted between the plurality of cells and the electrical load means in order to cut off the current flowing in the electrical load means in case it reaches the discharge termination voltage of the plurality of rechargeable cells.

23 Claims, 5 Drawing Sheets

MANAGE SYSTEM OF RECHARGEABLE BATTERY AND A METHOD FOR MANAGING THEREOF

BACKGROUND OF THE INVENTION

1. Field of the Invention

The present invention relates to a system to recharge batteries (or secondary cell, storage battery) and a method for managing the system. More specifically, the present invention relates to a system and a method for managing rechargeable batteries which are used in various portable electrical equipment such as a wireless radio, an audio tape player, a camera, an electric lamp and so on. In the system the termination voltage is equalized using parallel discharging method before charging the rechargeable battery so that the durability of the rechargeable battery is expanded and the efficiency of the charging is enhanced.

2. Description of the Background Art

The rechargeable battery, so called a secondary battery, or a storage battery is produced and sold in various types and sizes. The typical types of the rechargeable battery includes a nickel cadmium (NiCd) type, a lead-acid type, a nickel metal hydride (NiMH) type, a lithium ion (Li-ion) type, a lithium polymer type, an alkaline type and so on.

These rechargeable batteries should be charged using the appropriate charging method in order that they may be used to their full extent. For example, the NiCd type is preferred to be fully discharged periodically. The Li-ion type, used in notebook computers video cameras, mobile telephones and so on, is preferred to be charged before it is discharged up to the discharge terminal voltage. The lithium polymer type, used in the small electrical devices, the medical equipment, computers and so on, should be always in a charged state before it is exhausted by discharge. The durability of the lithium polymer type could be shortened, if it is fully discharged like nickel cadmium type.

As mentioned above, many rechargeable batteries are not fully utilized and are wasted due to misuse. The wasted rechargeable batteries contributed to environmental pollution, especially, the Ni—Cd type battery, which causes a serious environmental problem due to the toxicity of cadmium. Many countries use their budget and carry out the educational campaign for collecting the used batteries. Furthermore, wasting of the rechargeable batteries unnecessarily consumes natural resource.

Hereinafter, we will focus the Ni—Cd and NiMH type chargeable batteries. Because the Ni—Cd type costs less and is easy to store and deliver as well as being rechargeable in a short time, it is still used in many fields.

Furthermore, it is the best kind of the rechargeable battery in the industrial field because the discharging energy per time is large, it is durable and it can be repeatedly recharged others. It is applied to electrical devices which need significant amount electrical energy such as a flash of a camera, a cordless telephone, a radio, a satellite auxiliary battery, a motor driver, a portable and wireless vacuum cleaner, a diving light, a radio controlled model (car, airplane and ship) and so on.

However, it the Ni-type battery is recharged without deep discharging, the rechargeable capacitance is reduced due to memory effect of crystalizing the un-reacted active materials.

Generally, the rechargeable batteries are used in serial connection with many cells except for the case of using only one cell. In this case, the cells are discharged so that they are in a different energy state. After the cells are used in a serial connection so that, they are discharged in different energy states, the energy state of the cells also become different if they are recharged. If a group of the cells are discharged and recharged many times, then the termination voltage of some cells could be lower than 0.1 volt. In this state, if the user further uses these cells, then the electrical potential is reversed so that these cells are in the battery reversal state.

If the secondary battery which comprises many rechargeable cells having different energy states are connected serially are recharged, then the recharging is stopped when one cell having the most high energy state sends the termination signal to the charger stopping the charge despite that other cells are not charged yet.

On the other hand, in the case of the secondary battery including an over discharged cell, the other cells reach over charged state before the over discharged cell is completely charged. That is, the status of some cells comprised in the secondary battery moves back and forth between the uncompleted charging state and the over discharging (or battery reversal) state. At the same time, the status of the other cells move back and forth between the completed charging state and the uncompleted discharging state. Therefore, all the cells are damaged.

The performance of the Ni-type rechargeable battery can be enhanced by deep discharging periodically so that the crystallized electrolytes are removed. However, the secondary battery generally comprises many cells connected in serial in order to obtain the desired electric voltage for using in the electrical device. Under this state, if one the secondary battery cell is discharged for management, then other cells of the secondary battery can be over discharged or be in the battery reversal state. That is, it is hard to recover or to equalize the cells using the discharging method in the serial connection.

In order to solve the above problem, the individual discharging method is suggested in the U.S. Pat. No. 3,980, 940, as shown in FIG. 1. This conventional invention suggests a method for managing the secondary battery in which the cells are equalized by deep discharging individually before they are recharged in serial connection. The rechargeable batteries (cells) 1a, 1b, 1c and, 1d are connected in serial connection. The recharging means 11 is connected to the rechargeable batteries 1a to 1d. The discharging means 21 comprising the electrical load means 23a, 23b, 23c and 23d and discharging blocking switch 25a, 25b, 25c and, 25d is connected with the rechargeable batteries 1a to 1d individually. That is, the electrical load means 23a to 23d and the discharging blocking switch 25a to 25d are connected to the rechargeable batteries 1a to 1d, respectively.

In this conventional invention, each cell 1a to 1d is discharged individually using the discharging means 21 after the cells are recharged in serial connection using the recharging means 11.

However, according to the conventional invention, the amount of the energy wastes during individual discharging is very big and it takes a long time to discharge all the cells in different energy state should be fully discharged.

SUMMARY OF THE INVENTION

There is a need for a system and a method in which the rechargeable batteries are equalized without the deep discharging of each battery individually. After that, the charging can be performed for a shorter time period. One object of the present invention is to provide a system and a method for managing the rechargeable batteries in which they are protected from the being damaged due to over discharge or over charge by equalizing the energy difference of the each rechargeable battery.

Another object of the present invention is to provide a system and a method for managing the chargeable batteries in which the rechargeable batteries are discharged in parallel connection for equalizing the energy states of the each battery and then they are recharged in serial connection, so that the discharging efficiency is maximized and the charging is performed quickly.

In order to obtain these objects, the present invention provides a managing system for rechargeable battery comprising a plurality of a rechargeable unit batteries, a closed loop circuit method which connects the cells in parallel connection electrically, an electrical load having regular voltage which is the sum of the maximum output voltage among the plurality of cells and being in parallel connection with the rechargeable cells which are connected in parallel with the closed loop circuit method, a rechargeable battery manager including a discharging blocking switch inserted between the plurality of cells and the electrical load means in order to cut off the current flowing in the electrical load means in case it reaches the discharge termination voltage of the plurality of rechargeable cells.

In addition, the present invention provides a method of managing the rechargeable battery including a step of discharging for a certain time period by parallel connecting the plurality of rechargeable cells which have different energy level using the battery manager for discharging.

The present invention also provides a plurality of rechargeable cells, a closed loop circuit means connecting the rechargeable cells, a selection switch connected to the closed loop circuit means which allows the cells to be connected either by parallel connection or serial connection, an electrical load having regular voltage which is the sum of the maximum output voltage among the plurality of cells and being in parallel connection with the rechargeable cells which are connected in parallel with the closed loop circuit method and a manager for rechargeable battery including a voltage applying means which provides rechargeable voltage between the both electrodes of the cells connected in the serial connection in case the cells are in serial connection at the same time the current flowing in the electrical load means is cut off by the switch means. Finally, the present invention provides a managing method for rechargeable batteries including steps of discharging the plurality of rechargeable cells which have different energy level for a certain time period by connecting them in parallel connection using the manager for chargeable cells and charging the plurality of the rechargeable cells by connecting them in serial connection after the above mentioned parallel discharge.

BRIEF DESCRIPTION OF THE ATTACHED DRAWINGS

DETAILED DESCRIPTION OF THE PREFERRED EMBODIMENTS

Figure 1:
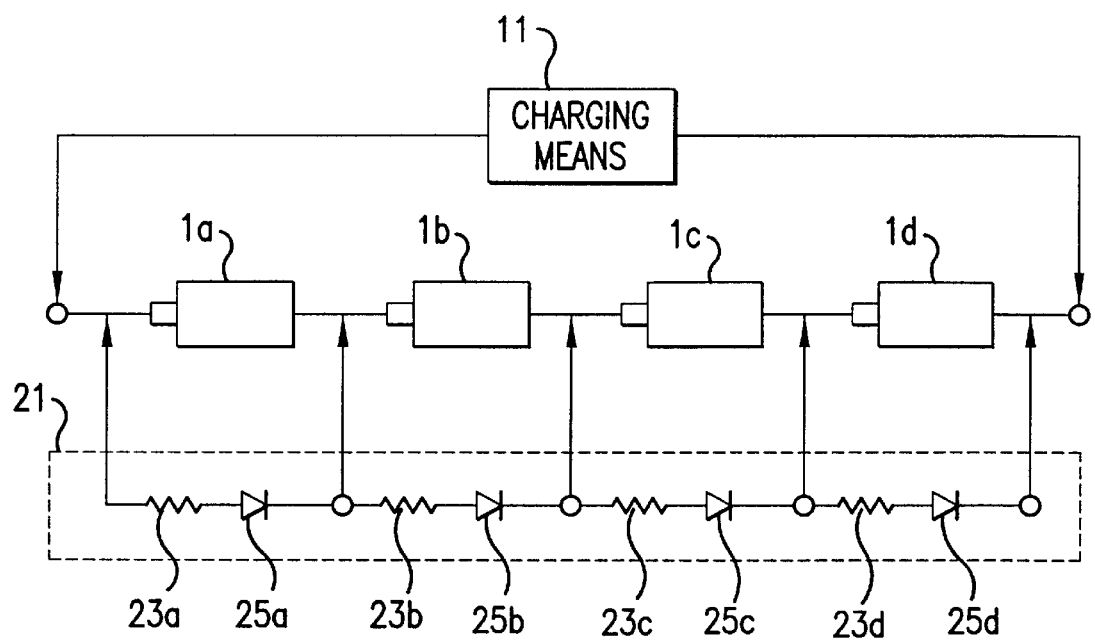
FIG. 1 is a illustration showing a method and a system of recharging the rechargeable battery individually after fully discharging by using the conventional method of individual discharging method.

Detailed description of the present invention will be described hereinafter with the preferred embodiments referring to the drawings.

Preferred Embodiment 1

Figure 2A:
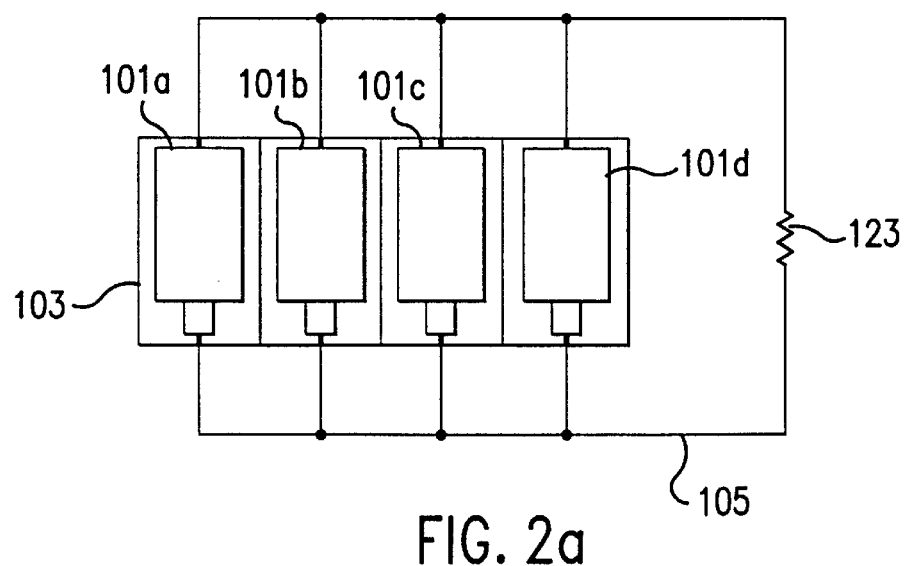
FIG. 2a is an illustration showing a method and a system of managing the rechargeable batteries by parallel discharging according to the present invention.

The FIG. 2a is a view showing a manager for the rechargeable battery system according to a first embodiment of the present invention. It shows the core scope of the present invention which is the managing module and the managing method thereof in order to have equalization of the rechargeable battery by the parallel connection. A rechargeable battery, in other words, a secondary battery, comprising at least one or more cells to be one group, is described.

In general, the secondary battery connects two, three, four, five, six, eight or ten cells in serial connection and is used to obtain the suitable electromotive force for the device to be used. In this preferred embodiment, a case of using four cells 101a, 101b, 101c and 101d which are used commonly in digital camera, a flash of camera, under water diving flash lights and toys is described. In case at least one of the cells 101a, 101b, 101c and 101d reaches the discharge termination voltage when the secondary battery is applied to a device, it needs to be recharged.

Figure 2B:
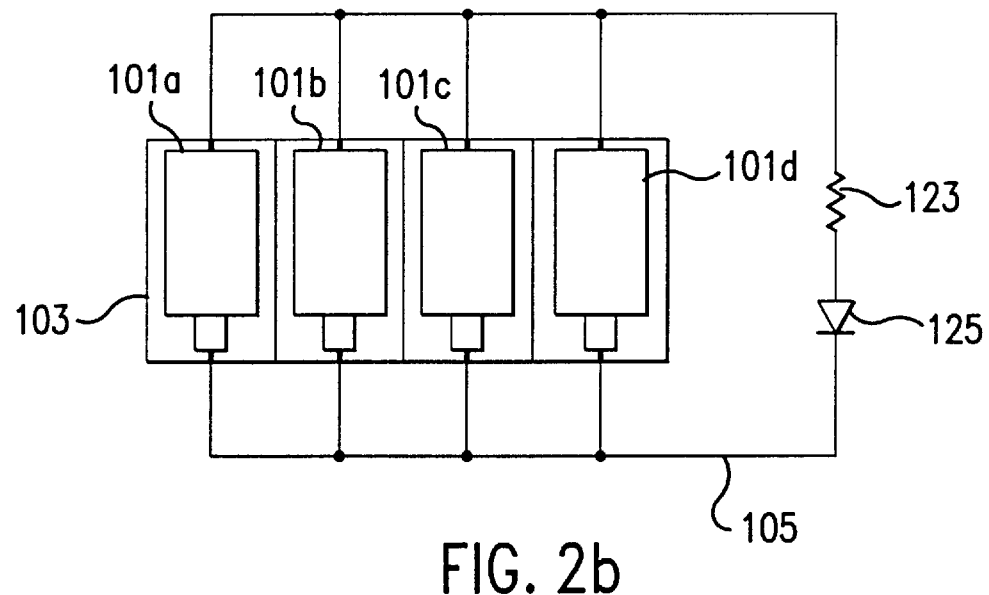
FIG. 2b is an illustration showing a method and a system of managing the rechargeable batteries by parallel discharging using a diode switch to block over discharging.

After separating the cells 101a, 101b, 101c and 101d from the devices, the cells are reconnected in parallel. Then, an electrical load 123 having the regular voltage corresponding to the electromotive force of a cell is connected in parallel with the cells 101a, 101b, 101c and 101d. As a result, each of the cells 101a, 101b, 101c and 101d comprising the secondary battery discharges simultaneously. The cells 101a, 101b, 101c and 101d may start with different voltage states, but are equalized after the parallel discharge. After each of the cells are equalized by carrying out the parallel discharge for a certain period of time, the cells are charge by connecting to the serial charging circuit. Time consumed in managing the chargeable battery by using parallel discharge can differ according to the condition of each cell. It is usually preferred to take the time consumed until the reaching the discharge termination voltage of the secondary battery connected in parallel as the managing time. Therefore, a silicon diode 125 having minimum through voltage (threshold voltage) corresponding to the sum of the discharge termination voltage of the secondary battery can be used by connecting it with the cells 101a, 101b, 101c and 101d in parallel as shown in FIG. 2b.

Figure 2C:
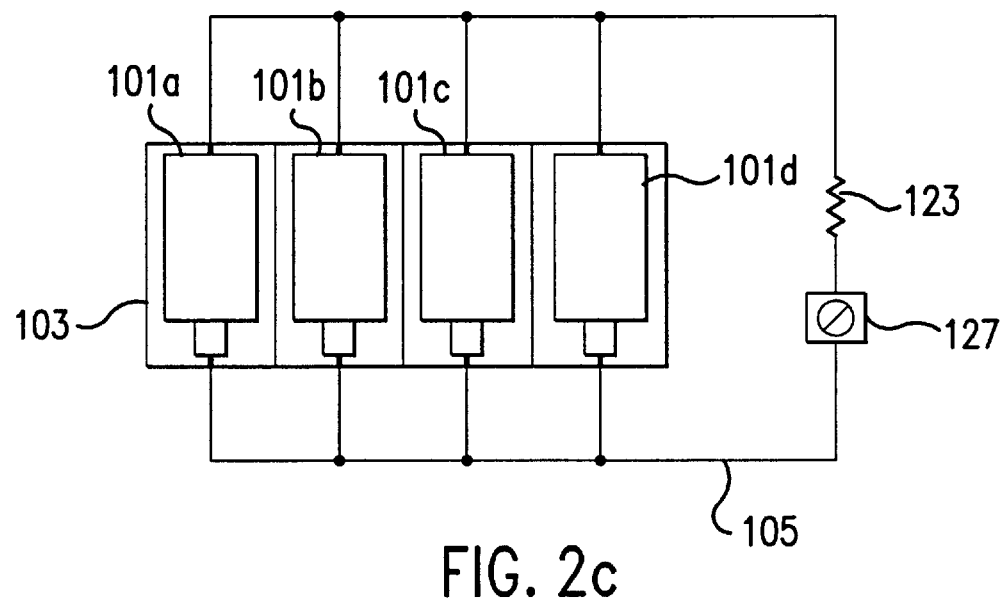
FIG. 2c is an illustration showing a method and a system of managing the rechargeable batteries by parallel discharging using a timer to block over discharging.

In another method, a timer 127 is installed in order to control the discharging time artificially as shown in FIG. 2c. According to our experience, effective management can be obtained by discharging 3 to 5 minutes when the discharge ratio is 1C to 2C (1C means charging or discharging its capacitance in an hour).

The rechargeable battery of the present invention basically includes the following elements: battery holders 103a, 103b, 103c and 103d which electrically connect the cells 101a, 101b, 101c and 101d, in other words, the plurality of rechargeable battery in order to carry out the managing method of the rechargeable battery. The cells 101a, 101b, 101c and 101d can be used in a serial connection so that they suit electromotive force of the electrical device being used.

A closed loop circuit 105 which connect the cells 101a, 101b, 101c and 101d in parallel connection is included. An electrical load 123 connected in parallel and having regular voltage which suits the electromotive force of the cells between both terminal of the cells 101a, 101b, 101c and 101d in the closed loop circuit means 105 is included. For the electrical load 123, a device like resistance, bulb and electrical motor which can consume regular voltage corresponding to the electromotive force of the cell is used.

A discharging blocking switch 125, which is in serial connection with the electrical load 123 and in parallel connection with cells 101a, 101b, 101c and 101d, prevents further discharge when the parallel connected cells 101a, 101b, 101c and 101d start discharging and finish discharging when it reaches the discharge termination voltage. It is preferable to use silicon diode having the minimum through voltage (threshold voltage) corresponding to the discharge termination voltage (in other words, the sum of parallel connection of the discharge termination voltage of each of the cells) of the secondary battery for the discharging blocking switch 125.

Preferred Embodiment 2

Figure 3:
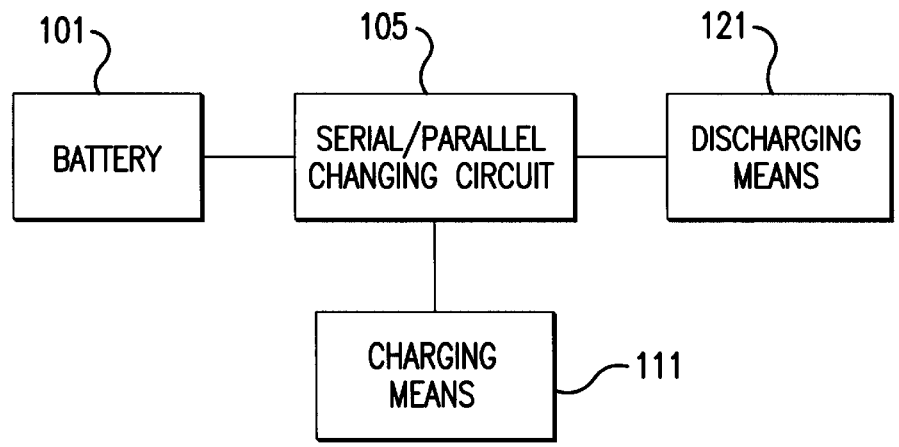
FIG. 3 is a block diagram showing the main concept of the present invention which suggests a method and a system of managing the rechargeable batteries by parallel discharging and serial recharging.

The preferred embodiment 1 illustrates the managing device and the managing method thereof in order to carry out parallel discharge of the rechargeable cells comprising the secondary battery for the purpose of equalization before recharging. In this second preferred embodiment, a managing device for the rechargeable battery which includes the charging function and the managing method thereof is illustrated. The FIG. 3 is a view showing the basic concept structure of a managing device for the rechargeable battery according to this preferred embodiment.

A rechargeable battery 101 comprising one or more cells as one group is needed. The chargeable battery 101 is connected to a closed loop circuit 105 which has a switch 107 that can choose between serial connection and parallel connection.

It is preferred that the selection switch 107 is connected to a battery condition tester 109 as the selection whether it is parallel or serial is determined by the voltage condition of the chargeable batteries 101. If the rechargeable batteries 101 are parallel connected by the selection switch 107, make the rechargeable battery to be connected with a discharger 123 having the regular voltage which corresponds to the electromotive force of one cell between the both terminals of the batteries 101.

A timer 127, which can send signal to change the connection of the rechargeable batteries 101 into serial connection after the discharging has been carried out for a certain period of time, may be connected between the selection switch 107 and the discharging means 123. After the parallel discharge is carried out for a certain period of time by the signal of the timer 127, a charger 111 for recharging the chargeable batteries 101 after transferring into a serial connection by the selection switch 107 is connected to the closed loop circuit 105.

Hereinafter, the concrete example of the present embodiment will be described. A secondary battery comprising one or more cell as one group is needed. In general, the secondary battery connects two, three, or more cells serially in order to obtain an acceptable electromotive force suitable for the device to be used. In this embodiment usage of four cells is introduced again as an example for it is used mostly commonly.

Battery holders 103a, 103b, 103c and 103d hold cells 101a, 101b, 101c and 101d. A closed loop circuit 105, which allows the cells 101a, 101b, 101c and 101d to be connected in parallel or in serial by using the conductive wire, like an electric wire is connected to the battery holder 103a, 103b, 103c and 103d.

A selection switch 107 which chooses either a serial connection or a parallel connection for the cells 101a, 101b, 101c and 101d is included in the closed loop circuit 105. The selection switch 107 can be selected among a rotary switch, relay or a semiconductor element like MOSFET (Metal Oxide Semiconductor Field Effect Transistor).

Both terminals of the cells 101a, 101b, 101c and 101d are connected to the charger 111 if the cells 101a, 101b, 101c and 101d are connected in serial connection and both terminals of the cells 101a, 101b, 101c and 101d are connected to the charger 123 if the cells 101a, 101b, 101c and 101d are connected in parallel connection according to the connection of the selection switch 107.

Figure 4:
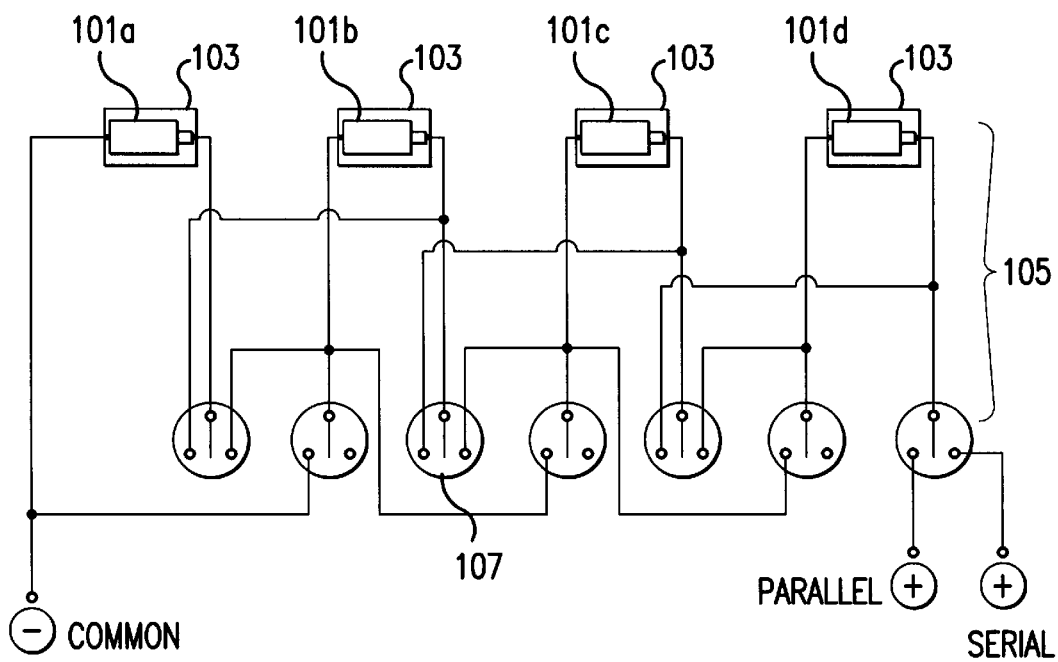
FIG. 4 is a close loop circuit diagram of the present invention.
Figure 5A:
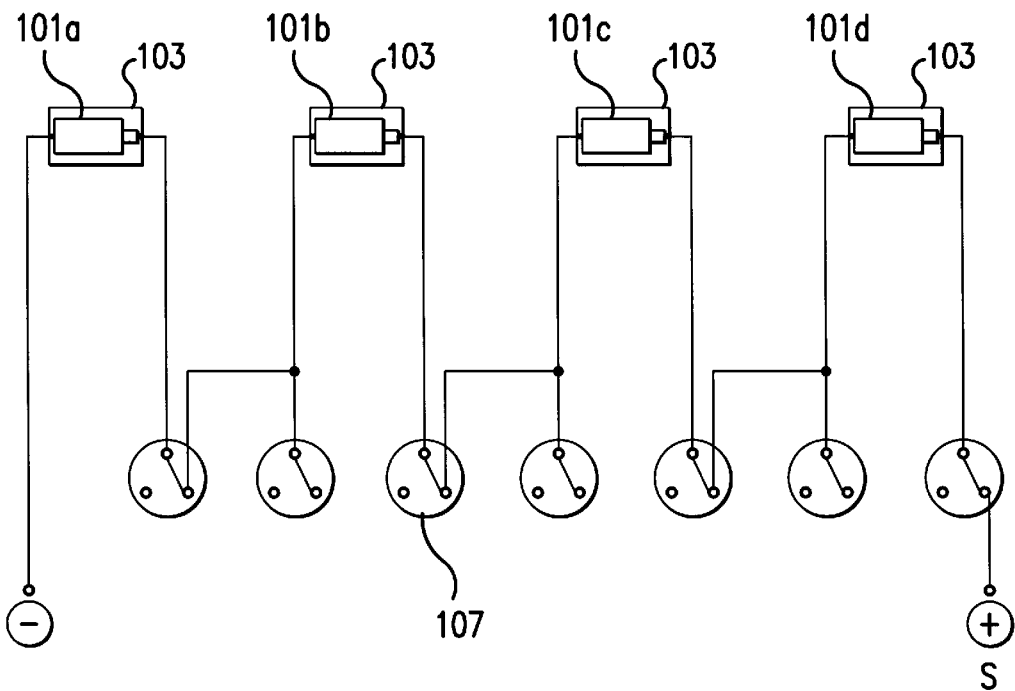
FIG. 5a is an illustration showing circuit in which the cells are connected in parallel by the switch operation.
Figure 5B:
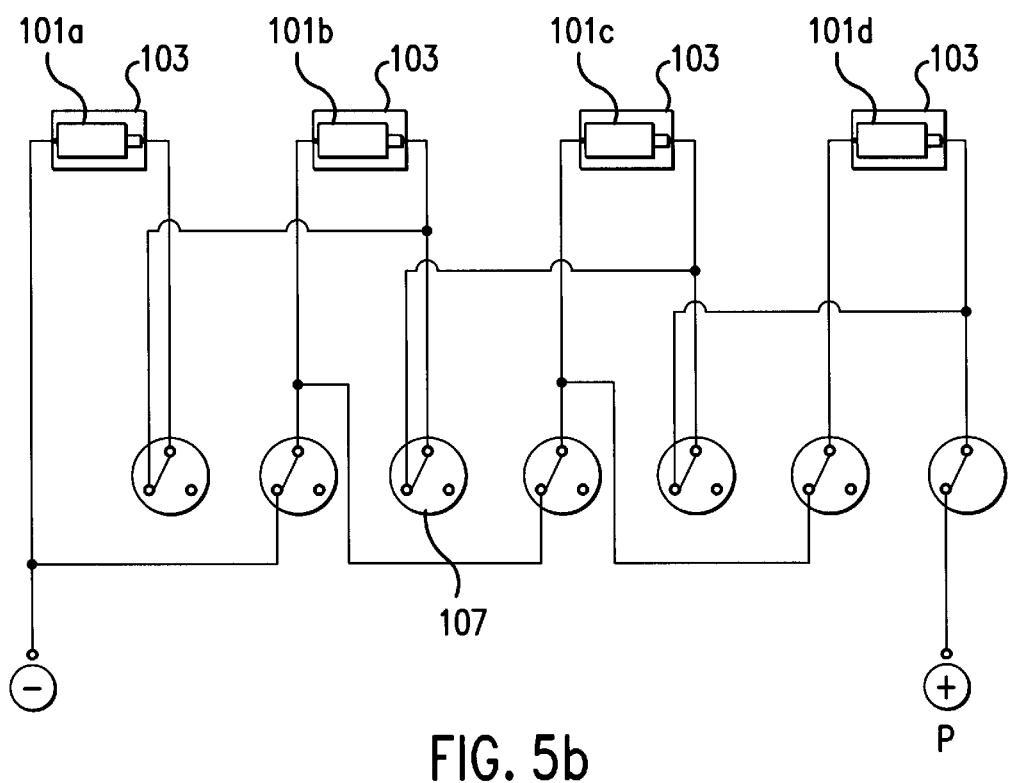
FIG. 5b is an illustration showing circuit in which the cells are connected in serial by the switch operation.

The FIG. 4 is a view showing an example of closed loop circuit 105 which is structured to connect either by serial connection or parallel connection. FIG. 5a shows a circuit when the cells are serially connected by the switch operation and FIG. 5b shows a circuit when the cells are parallely connected by the switch operation.

Figure 6:
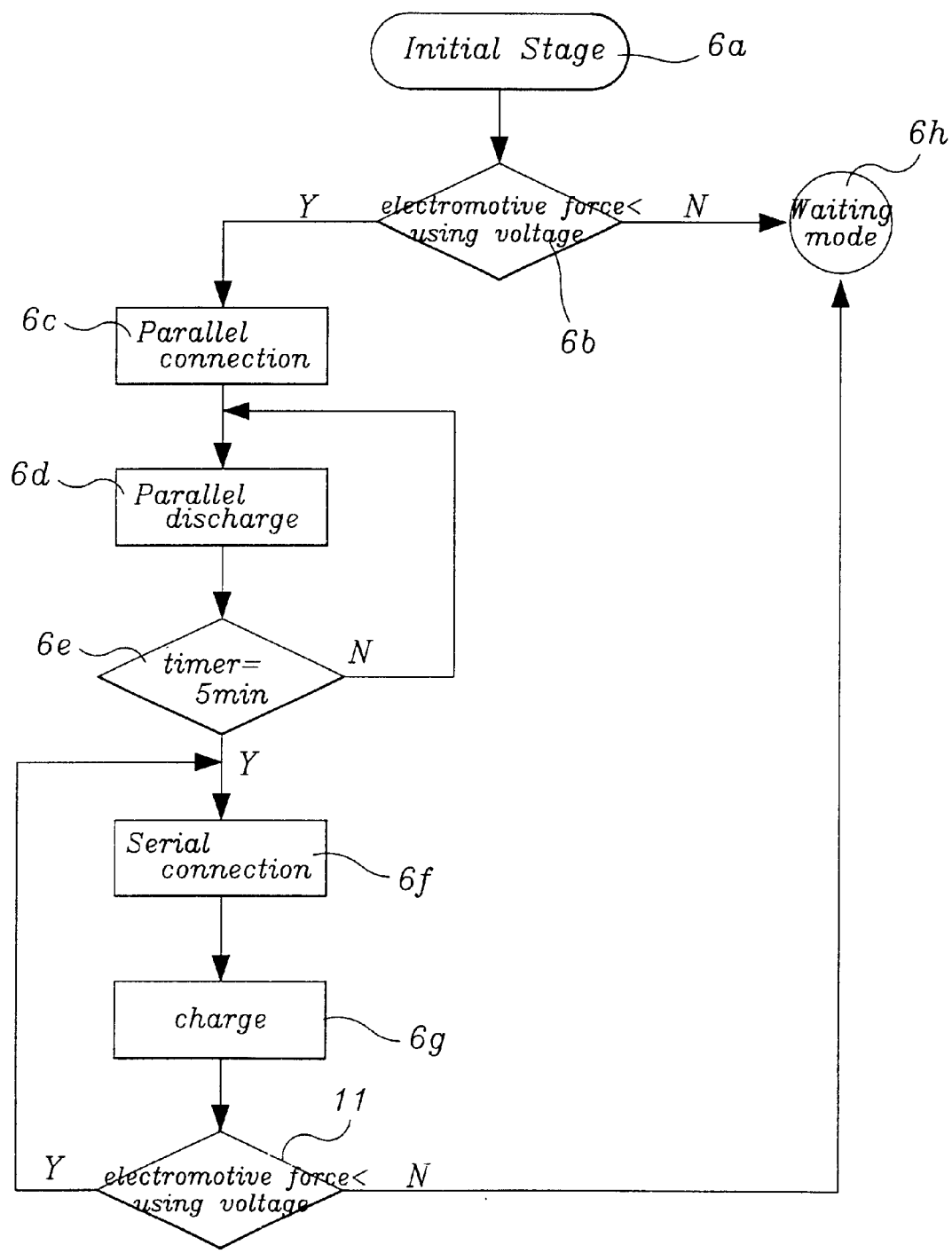
FIG. 6 is an illustration showing the operation condition of the battery managing device according to the present invention.

The managing method using the above mentioned device for managing the rechargeable battery is described in the following. FIG. 6 is a view showing the operation condition of the battery managing device according to the present invention.

The closed loop circuit 105 connects the cells 101a, 101b, 101c and 101d serially in the initial stage 6a as shown in FIG. 6. Test the electromotive force of the cells 101a, 101b, 101c and 101d which are connected to the closed loop circuit 105 structured in serial and check whether it is lower than the usable voltage or not as shown in state 6b of FIG. 6. If the electromotive force is lower than the usable voltage, the selection switch 107 changes and connects the cells 101a, 101b, 101c and 101d in a parallel connection as shown in state 6c of FIG. 6. Then, the cells 101a, 101b, 101c and 101d are parallel discharged by the discharger 123 as shown in stage 6d of FIG. 6.

The time consumed in parallel discharge is automatically set up by a timer 127 which is installed between the 123 and the selection switch 107. It is preferred that the time for discharging is set up to be within 5 minutes as shown in state 6e of FIG. 6. When the signal indicating that the parallel discharging is completed by the timer 127 is transferred to the selection switch 107, the connection of the cells 101a, 101b, 101c and 101d are changed into a serial connection as shown in state 6f of FIG. 6. Then, the cells 101a, 101b, 101c and 101d are connected to the charging means 111 in serial connection and recharging is carried out as shown in state 6g of FIG. 6. The electromotive force is monitored while charging and if it is same or higher than the using voltage as shown in stage 6b of FIG. 6, charging is ceased and goes into a waiting mode as shown in stage 6h of FIG. 6.

In case of recharging, in order to carry out the charging in high speed, the parallel discharge is carried out for about 3 to 5 minutes for managing and carry out the discharge under the condition of charging ratio of about 3C–4C. As a result, charging is completed within 30 minutes.

The present invention provides the managing device for chargeable battery which charges by connecting the same kinds of chargeable batteries in serial connection after carrying out in discharging the parallel connection.

According to the present invention, high speed charging is possible as the chargeable battery is recharged after equalizing the battery cells through parallel discharge. Also, over charged and over discharged rechargeable battery which were thought to be destroyed are recycled during the process of equalization through the parallel discharge.

Finally, durability of the chargeable battery is expanded even though the number of managing and charging are repeated by the battery managing device according to the present invention.

What is claimed is:

1. A managing device for rechargeable battery comprising:
    battery holders which can connect cells electrically;
    a closed loop circuit which connects the battery holders having the cells in serial and parallel connection;
    a discharging unit which discharges the cells when the cells are in parallel connection and
    a charging unit which charges the cells when the cells are in serial connection.

2. The managing device for rechargeable battery according to claim 1 wherein the discharging unit comprise an electrical load having the regular voltage corresponding to an electromotive force of the cell.

3. The managing device for rechargeable battery according to claim 1 further includes a discharging blocking switch which is connected with the discharging unit in a serial connection and which is connected with the cells in parallel connection.

4. The managing device for rechargeable battery according to claim 3 wherein the discharging blocking switch include a diode having the minimum through voltage which corresponds to the sum voltage of discharge termination voltage of the cells which are in parallel connection.

5. A managing device for rechargeable battery comprising:
    battery holders which can connect cells electrically;
    a closed loop circuit which enables the battery holders having the cells to be connected at least one of a serial connection and a parallel connection;
    a selecting switch which is connected to the closed loop circuit means choose at least one of a serial connection and a parallel connection for the cells;
    a discharging unit connected with the cells in parallel connection if the cells are in parallel connection; and
    a charging unit connected with the cells in a serial connection if the cells are in a serial connection.

6. The managing device for rechargeable battery according to claim 5 further includes a timer which determines the discharging time when the parallel connected cells are discharges by the discharging unit.

7. The managing device for rechargeable battery according to claim 5 wherein the discharging unit include an electrical load having the regular voltage corresponding to the electromotive force of the cells.

8. The managing device for rechargeable battery according to claim 5 wherein the selection switch include at least one from a relay, rotary switch and switch element group including a semiconductor switching element.

9. A managing method for rechargeable battery comprising steps of:
    parallel connecting at least two cells; and
    parallel connecting the cells by connecting to a discharging unit which has the regular voltage corresponding to the maximum output voltage of the cells and which are connected with the parallel connected cells in parallel connection.

10. A managing method for rechargeable battery comprising steps of:
    connecting in serial at least two cells;
    determining whether the electromotive force of the cells are lower than the usable voltage or not by checking the electromotive force of the cells; connecting the cells in parallel if the electromotive force of the cells is lower than the usable voltage and carrying out the parallel discharge for a predetermined time; and
    carrying out recharging by changing the cells into a serial connection state.

11. A battery discharge-recharge device, comprising:
    a plurality of battery holders;
    a closed-loop circuit that connects batteries in said battery holders; and
    a switching circuit connected to said closed-loop circuit, wherein said switching circuit connects said batteries in parallel when in a discharge mode and connects said batteries in serial when in a recharge mode.

12. The device of claim 11, wherein said switching circuit includes:
    a timer such that after a predetermined period of time in said discharge mode, said timer sends a signal to switch to said charge mode.

13. The device of claim 11, wherein said switching circuit includes:
    a voltage determiner that determines said batteries have been fully discharged and sends a signal to switch to said charge mode.

14. The device of claim 13, wherein said voltage determiner is a diode.

15. The device of claim 11, wherein said switching unit includes at least one of a rotary switch, relay, and MOSFET.

16. The device of claim 11, further comprising:
    a discharging unit connected to said closed-loop and is activated when in said discharge mode.

17. The device of claim 11, further comprising:
    a charging unit connected to said closed-loop and is activated when in said charge mode.

18. A method to discharge and recharge batteries, the method comprising:
    holding a plurality of said batteries;
    connecting said batteries in parallel when in a discharge mode and connecting said batteries in serial when in a recharge mode;
    discharging said batteries if in said discharge mode; and
    recharging said batteries if in said recharge mode.

19. The method of claim 18, further comprising:
    switching to said recharge mode after a predetermined period of time in said discharge mode.

20. The method of claim 18, further comprising:
switching to said recharge mode after determining said batteries have been fully discharged in said discharge mode.

21. The method of claim 18, further comprising:
determing an electromotive force of said batteries;
switching to said discharge mode if said electromotive force of said batteries is below a predetermined threshold; and
switching to a waiting mode if said electromotive force of said batteries is at or above said predetermined threshold.

22. The method of claim 21, wherein if in said discharge mode:
determining said electromotive force of said batteries; and
switching to said recharge mode after determining said batteries have been fully discharged.

23. The method of claim 22, wherein if in said recharge mode:
determining said electromotive force of said batteries; and
switching to said waiting mode after determining said batteries have been fully charged.

* * * * *